United States Patent
Takeda et al.

(10) Patent No.: US 10,522,274 B2
(45) Date of Patent: Dec. 31, 2019

(54) FERROMAGNETIC METAL NANOWIRE DISPERSION AND METHOD FOR MANUFACTURING SAME

(71) Applicant: UNITIKA LTD., Amagasaki-shi, Hyogo (JP)

(72) Inventors: Hirotaka Takeda, Uji (JP); Hayami Onishi, Uji (JP); Terumasa Yoshinaga, Uji (JP)

(73) Assignee: UNITIKA LTD., Amagasaki-Shi (JP)

( * ) Notice: Subject to any disclaimer, the term of this patent is extended or adjusted under 35 U.S.C. 154(b) by 513 days.

(21) Appl. No.: 15/305,514

(22) PCT Filed: Apr. 17, 2015

(86) PCT No.: PCT/JP2015/061881
§ 371 (c)(1),
(2) Date: Oct. 20, 2016

(87) PCT Pub. No.: WO2015/163258
PCT Pub. Date: Oct. 29, 2015

(65) Prior Publication Data
US 2017/0047150 A1     Feb. 16, 2017

(30) Foreign Application Priority Data
Apr. 21, 2014  (JP) .................. 2014-087378

(51) Int. Cl.
| H01F 1/00 | (2006.01) |
| C09D 7/40 | (2018.01) |
| C09D 5/24 | (2006.01) |
| C09D 101/28 | (2006.01) |
| C09D 139/06 | (2006.01) |
| H01B 1/02 | (2006.01) |
| C08K 3/08 | (2006.01) |
| C08K 7/06 | (2006.01) |

(52) U.S. Cl.
CPC ............ *H01F 1/0072* (2013.01); *C09D 5/24* (2013.01); *C09D 7/70* (2018.01); *C09D 101/286* (2013.01); *C09D 139/06* (2013.01); *H01B 1/02* (2013.01); *C08K 3/08* (2013.01); *C08K 7/06* (2013.01); *C08K 2003/0862* (2013.01); *C08K 2201/001* (2013.01)

(58) Field of Classification Search
CPC ....... H01F 1/0072; H01F 1/0081; C09D 7/61; C09D 7/70; C09D 7/66; C09D 5/24; H01B 1/02; H01B 1/22
See application file for complete search history.

(56) References Cited

U.S. PATENT DOCUMENTS

| 2007/0074316 A1 | 3/2007 | Alden et al. |
| 2007/0284257 A1 | 12/2007 | Fukunaka et al. |
| 2008/0173576 A1* | 7/2008 | Choi ..................... B22F 1/0025 210/170.07 |
| 2010/0101832 A1 | 4/2010 | Verhaverbeke et al. |
| 2010/0266956 A1 | 10/2010 | Naoi et al. |
| 2012/0138913 A1* | 6/2012 | Alsayed ................ B22F 1/0025 257/40 |
| 2012/0255762 A1 | 10/2012 | Katagiri et al. |
| 2013/0087363 A1* | 4/2013 | Oh .................. H01L 31/022466 174/126.1 |
| 2013/0251983 A1* | 9/2013 | Kondo ..................... H01B 1/22 428/336 |
| 2014/0134041 A1 | 5/2014 | Hotta |

FOREIGN PATENT DOCUMENTS

| CN | 103338882 A | 10/2013 |
| CN | 103493149 A | 1/2014 |
| JP | 2004-149871 A | 5/2004 |
| JP | 2004-269987 A | 9/2004 |
| JP | 2005-277182 A | 10/2005 |
| JP | 4374439 B2 | 12/2009 |
| JP | 2010-229288 A | 10/2010 |
| JP | 2010-250109 A | 11/2010 |
| JP | 2011-58021 A | 3/2011 |
| JP | 2012-9239 A | 1/2012 |
| JP | 2012-59417 A | 3/2012 |
| JP | 2012-216535 A | 11/2012 |
| JP | 2012-238592 A | 12/2012 |
| JP | 2013-151752 A | 8/2013 |
| JP | 2013-155440 A | 8/2013 |
| JP | 2013-196918 A | 9/2013 |
| JP | 2013-199690 A | 10/2013 |
| JP | 2014-505963 A | 3/2014 |
| TW | 201030771 A1 | 8/2010 |
| TW | 201413753 A | 4/2014 |
| WO | WO 2007/022226 A2 | 2/2007 |
| WO | WO 2010/047922 A2 | 4/2010 |
| WO | WO 2012/078191 A1 | 6/2012 |
| WO | 102725085 A | 10/2012 |
| WO | WO 2013/146509 A1 | 10/2013 |
| WO | WO 2015/068540 A1 | 5/2015 |

OTHER PUBLICATIONS

International Search Report (Form PCT/ISA/210) for International Application No. PCT/JP2015/061881, dated Jul. 21, 2015.
Chinese Office Action issued in corresponding Chinese Application No. 201580020292.8 and dated Mar. 14, 2018.
Chinese Office Action dated Nov. 13, 2018 for Application No. 201580020292.8, with an English translation.
Taiwanese Office Action and Search Report for Taiwanese Application No. 104112563, dated Dec. 22, 2018, with English translation.

(Continued)

*Primary Examiner* — C Melissa Koslow
(74) *Attorney, Agent, or Firm* — Birch, Stewart, Kolasch & Birch, LLP

(57) ABSTRACT

The present invention provides a ferromagnetic metal nanowire dispersion having an excellent dispersibility, from which a ferromagnetic metal nanowire film having an excellent electrical conductivity can be made. The present invention relates to a ferromagnetic metal nanowire dispersion comprising a ferromagnetic metal nanowire and a polymer compound.

4 Claims, 4 Drawing Sheets

(56) References Cited

OTHER PUBLICATIONS

International Preliminary Report on Patentability and Written Opinion of the International Searching Authority (Forms PCT/IB/326, PCT/IB/338, PCT/IB/373 and PCT/ISA/237), dated Nov. 3, 2016, for International Application No. PCT/JP2015/061881, including an English translation thereof.
Chinese Office Action and Search Report for Chinese Application No. 201580020292.8, dated Jul. 5, 2017.
Japanese Notice of Reasons for Refusal (including an English translation thereof) issued in the corresponding Japanese Patent Application No. 2016-514905 dated May 14, 2019.
Chinese Notification of Reexamination (including an English translation thereof) issued in the corresponding Chinese Patent Application No. 201580020292.8 dated Jul. 31, 2019.

\* cited by examiner

[Fig.1]
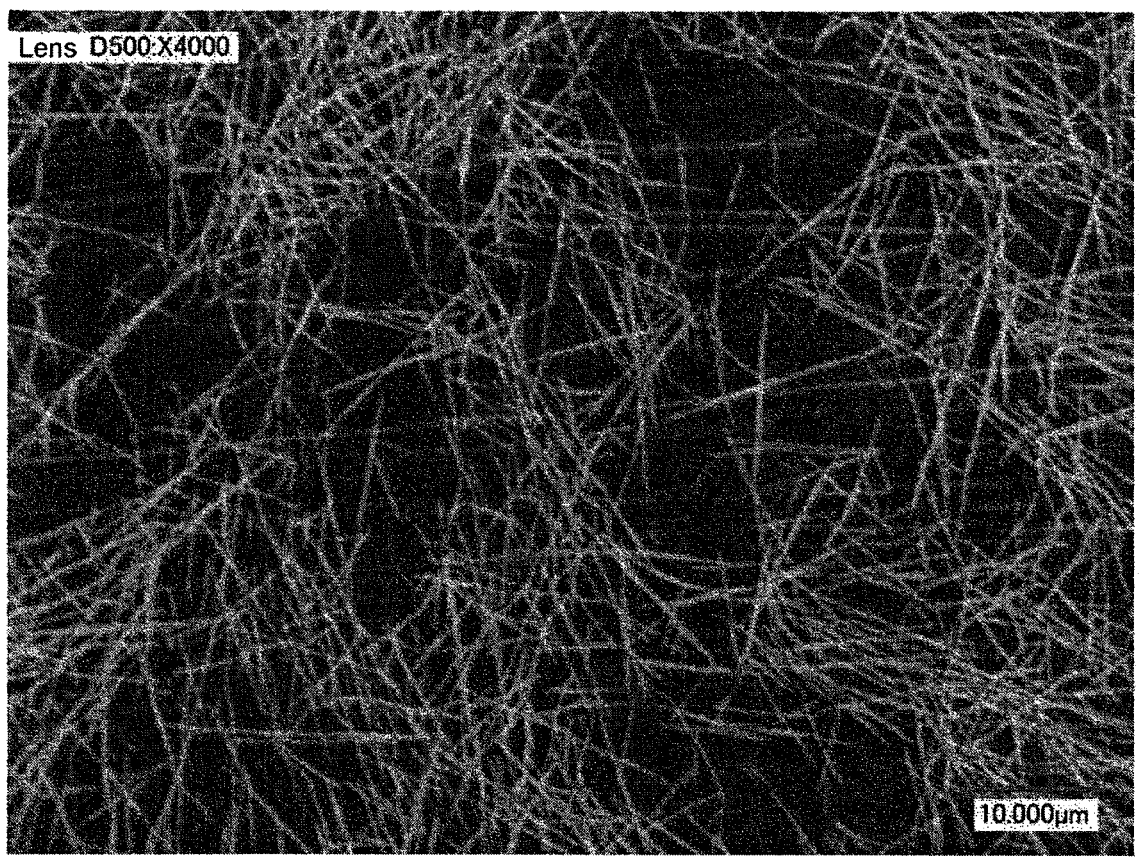

[Fig.2]
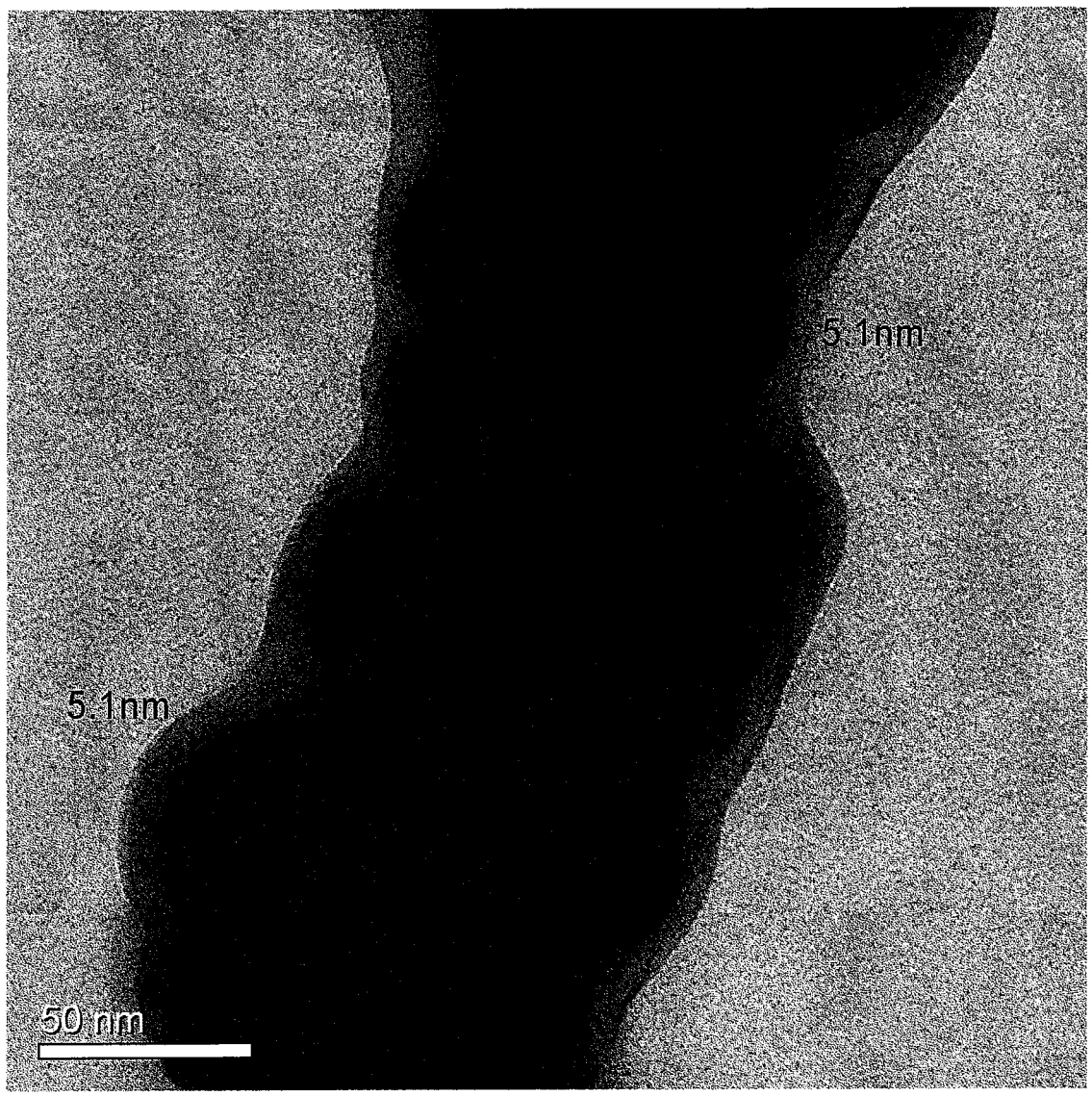

[Fig.3]
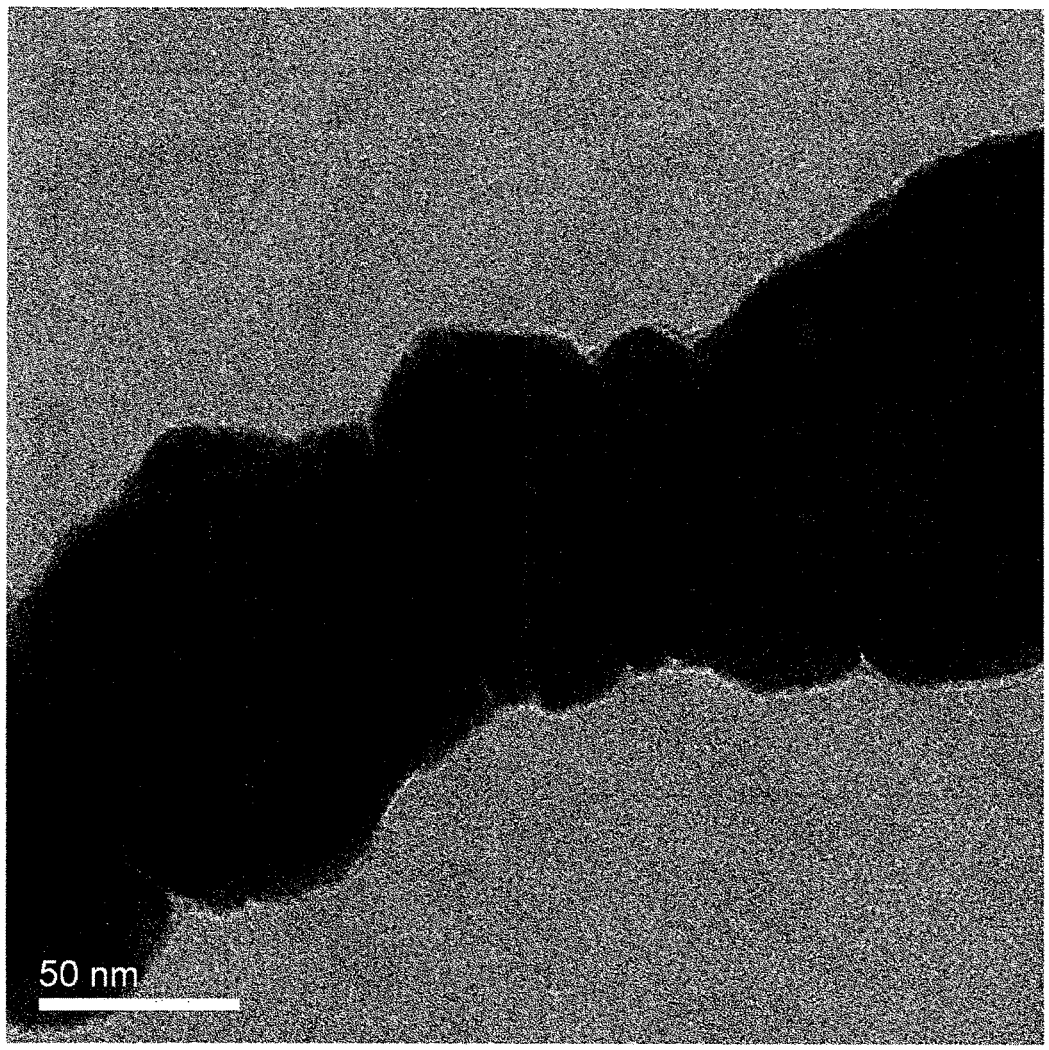
[Fig.4]
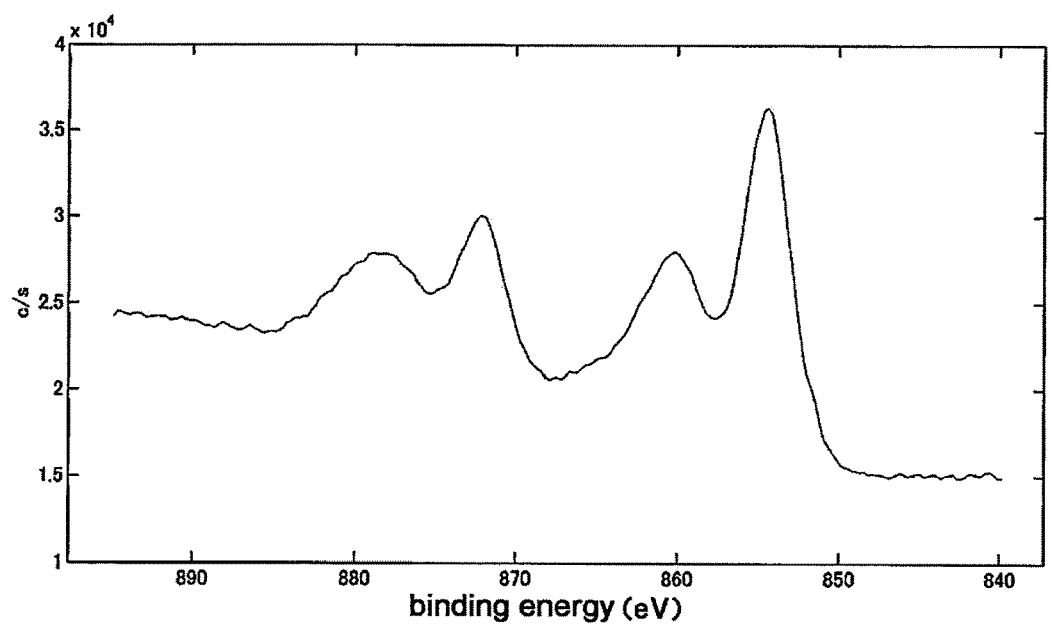

[Fig.5]
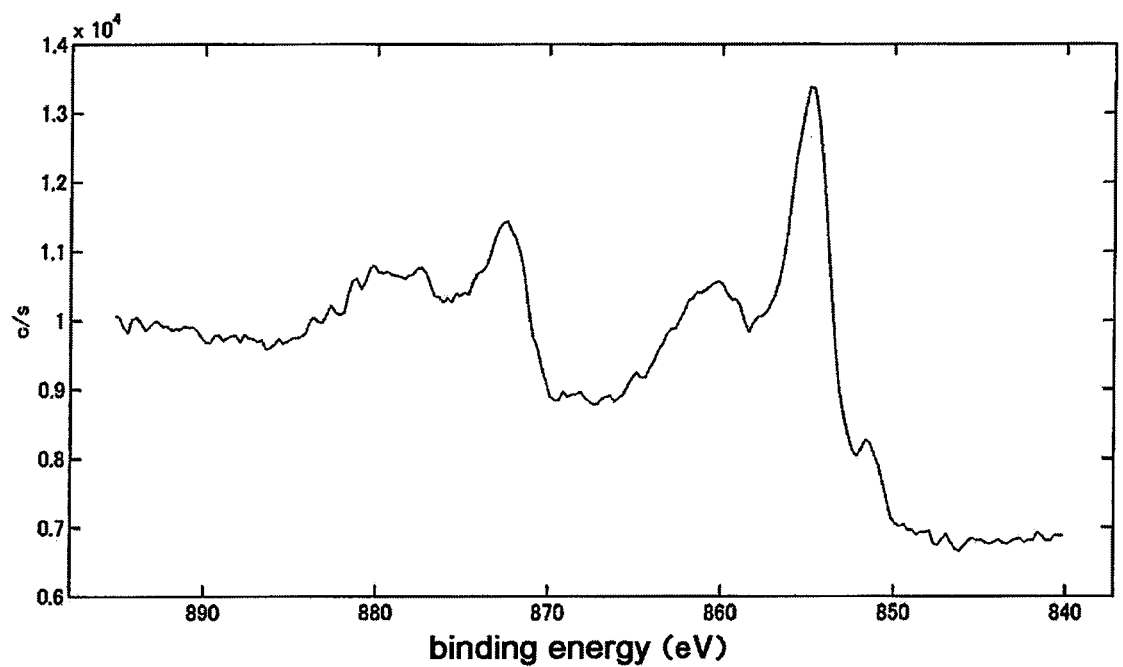
[Fig.6]
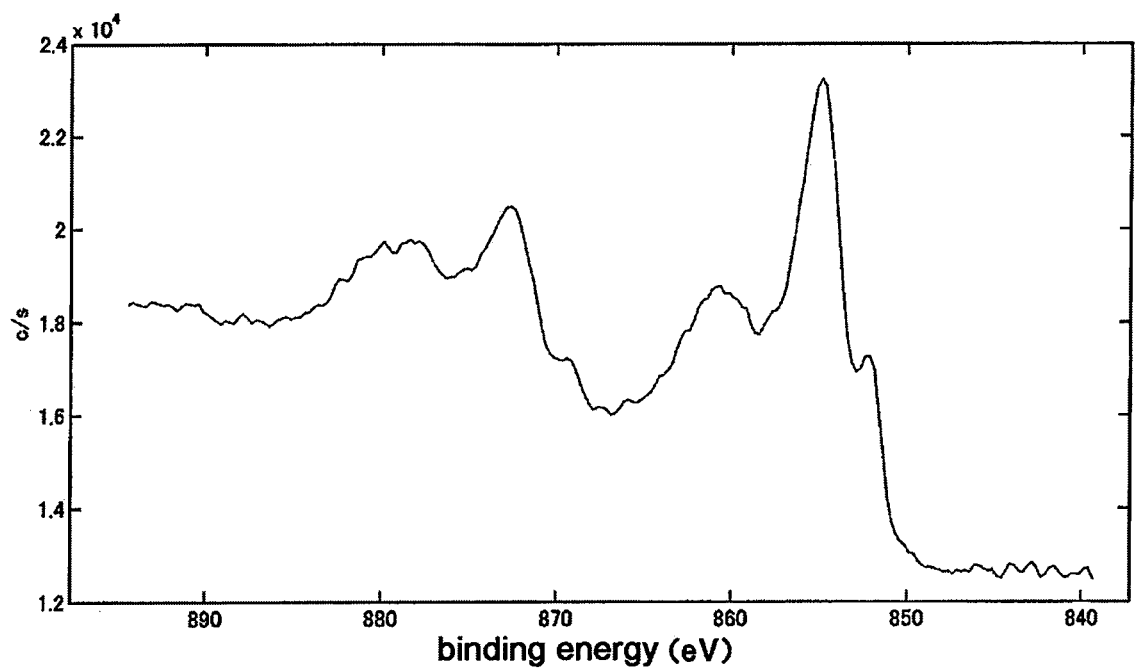

FERROMAGNETIC METAL NANOWIRE DISPERSION AND METHOD FOR MANUFACTURING SAME

TECHNICAL FIELD

The present invention relates to a ferromagnetic metal nanowire dispersion and a method for manufacturing same.

BACKGROUND ART

In recent years, with expansion of the market of solar cells, and expansion of demand of touch panels due to rapid spread of smartphones and tablets, a transparent electrically conductive film has widely been used as a transparent electrode. As for the transparent electrically conductive film, from a view point of weight saving, film thinning, and increase in flexibility, transparent electrically conductive films have often been used. Currently, most of the transparent electrically conductive films are ITO films in which indium tin oxide serves as an electrically conductive layer.

However, the ITO film has a problem in color tone due to a low light transmittance in a long wavelength region. Moreover, since ITO is a semiconductor, there is a limitation on increase in electrical conductivity, and, since an electrically conductive layer is ceramics, the ITO film has a problem in bending property. For this reason, there has been a demand for a flexible film having a higher transmittance and a high electrical conductivity.

Then, currently, as a next-generation transparent electrically conductive film, various transparent electrically conductive films made from a carbon nanotube, or a metal nano-material such as a metal fine wire and a silver nanowire constituting a mesh structure have been proposed (Patent Literatures 1 to 3).

When the carbon nanotube is used, since the electrical conductivity of the carbon nanotube serving as an electrically conductive filler is inferior to that of a metal material, performance as a transparent electrically conductive film is not satisfactory. In addition, a transparent electrically conductive film formed of a metal mesh structure has a high electrical conductivity, but has a problem that a metal fine wire is visible. A transparent electrically conductive film made from a metal nanowire can realize both of an electrical conductivity and a transparency.

As the metal nanowire used in the transparent electrically conductive film, from a view point of an electrical conductivity, silver is widely used. However, silver is a metal material that has a high electrical conductivity but very easily causes ion migration. Thus, silver adversely influences on the insulating property between film substrates or between wires. In a nanostructure such as a nanowire, even a minute change in shape remarkably changes the electric property. For these reasons, a transparent electrically conductive film made from a silver nanowire as an electrically conductive material has a problem that a reliability of a device or the like is reduced.

Then, there has been proposed a method of imparting an ion migration resistance to a silver nanowire surface by coating the surface with another metal material through plating or the like to improve stability (Patent Literatures 4 and 5). However, in these methods, since the resulting silver nanowire surface is plated or sulfurized, the process is complicated. Moreover, since the different metal is formed only on the surface, there are problems in uniformity, durability, and an electrical conductivity.

For this reason, as for a nanowire made of a metal material other than silver, particularly, there has been proposed a technique concerning a nickel nanowire and a cobalt nanowire, which have high stability and can also be used as a magnetic material (Patent Literatures 6 to 8).

However, in these methods, a metal nanowire is made inside the carbon nanotube. Thus, the methods have a problem that a metal nanowire cannot be used alone, treatment at a higher temperature is necessary (Patent Literature 6), and only a relatively short nanowire having a length of up to around 10 μm is obtained (Patent Literatures 7 and 8).

There has been proposed a method of obtaining a ferromagnetic metal nanowire having a large nanowire length (Patent Literatures 9 and 10). However, nanowires obtained by these methods are not supposed to be dispersed. Thus, the nanowire length is large, but nanowires are entangled complicatedly and come into a state where the nanowires are aggregated in a sheet or cotton form. For this reason, the nanowire obtained by the methods is suitable for use in a structure such as a battery electrode material, but is difficult to be defiberized while maintaining the nanowire shape, and it is impossible to apply the nanowire to paints and inks as a dispersion.

There has been proposed a method of obtaining a dispersed ferromagnetic metal nanowire (Patent Literature 11). In this method, a dispersion in which metal nanowires having a length of around 100 μm are dispersed in a solvent is obtained. However, in the dispersion, nanowires are easily precipitated and aggregated. Moreover, in order that a nanowire film obtained from the dispersion has an electrical conductivity, plating with a noble metal is indispensable. Additionally, since the nanowire making method is of a template system, the method is poor in productivity.

PRIOR ART LITERATURES

Patent Literatures

Patent Literature 1: JP-A-2010-229288
Patent Literature 2: JP-A-2012-59417
Patent Literature 3: JP-A-2012-216535
Patent Literature 4: JP-A-2013-151752
Patent Literature 5: JP-A-2013-155440
Patent Literature 6: JP-A-2004-269987
Patent Literature 7: JP-A-2005-277182
Patent Literature 8: Japanese Patent No. 4374439
Patent Literature 9: JP-A-2004-149871
Patent Literature 10: JP-A-2011-58021
Patent Literature 11: JP-A-2012-238592

SUMMARY OF THE INVENTION

Problems to be Solved by the Invention

The present invention aims to solve the aforementioned problems, and an object thereof is to provide a ferromagnetic metal nanowire dispersion having an excellent dispersibility, from which a ferromagnetic metal nanowire film having an excellent electrical conductivity can be made, and a method for manufacturing same.

Means for Solving the Problems

The gist of the present invention is as follows.
(1) A ferromagnetic metal nanowire dispersion containing a ferromagnetic metal nanowire and a polymer compound.

(2) The dispersion of item (1), having a layer of the polymer compound on a surface of the ferromagnetic metal nanowire.
(3) The ferromagnetic metal nanowire dispersion of item (1) or (2), further containing a dispersing medium selected from the group consisting of water, an organic solvent and a mixture thereof.
(4) The ferromagnetic metal nanowire dispersion of item (3), wherein the dispersing medium is a solvent that exhibits reducibility or a solvent containing an antioxidant.
(5) A method for manufacturing the ferromagnetic metal nanowire dispersion of any one of items (1) to (4), the method including a step of reducing a ferromagnetic metal ion in a solution of a polymer compound to make a ferromagnetic metal nanowire.
(6) The method for manufacturing the ferromagnetic metal nanowire dispersion of item (5), further including a step of reducing the ferromagnetic metal nanowire.
(7) The method for manufacturing the ferromagnetic metal nanowire dispersion of item (5) or (6), further including a step of dispersing the ferromagnetic metal nanowire in a dispersing medium.
(8) The method for manufacturing the ferromagnetic metal nanowire dispersion of item (7), wherein the dispersing medium is a solvent that exhibits reducibility or a solvent containing an antioxidant.
(9) An electrically conductive film, which is formed from the ferromagnetic metal nanowire dispersion of any one of items (1) to (4).
(10) A laminate including a substrate and the electrically conductive film of item (9) formed on the substrate.

Effects of the Invention

The ferromagnetic metal nanowire dispersion of the present invention has an excellent dispersibility, and can also provide a ferromagnetic metal nanowire film having an excellent electrical conductivity. In addition, since the ferromagnetic metal nanowire dispersion of the present invention can maintain an excellent dispersibility over a long term, it is also excellent in dispersion stability.

BRIEF DESCRIPTION OF THE DRAWINGS

FIG. 1 is a scanning electron microscope image of a dried product of a nickel nanowire dispersion obtained in Example 1.
FIG. 2 is a transmission electron microscope image obtained by staining a nickel nanowire obtained in Example 1 with phosphotungstic acid and taking a photograph thereof.
FIG. 3 is a transmission electron microscope image obtained by staining a nickel nanowire obtained in Comparative Example 1 with phosphotungstic acid and taking a photograph thereof.
FIG. 4 is a spectrum of X-ray photoelectron spectroscopy (nickel 2p narrow band) of a nickel nanowire before reduction treatment.
FIG. 5 is a spectrum of X-ray photoelectron spectroscopy (nickel 2p narrow band) of a nickel nanowire after reduction treatment.
FIG. 6 is a spectrum of X-ray photoelectron spectroscopy (nickel 2p narrow band) of a nickel nanowire obtained from Example 1.

MODE FOR CARRYING OUT THE INVENTION

[Ferromagnetic Metal Nanowire Dispersion]
The ferromagnetic metal nanowire dispersion of the present invention contains a ferromagnetic metal nanowire (hereinafter, sometimes simply referred to as "nanowire") and a polymer compound, and usually further contains a dispersing medium.

Examples of the ferromagnetic metal constituting the nanowire include iron, cobalt, nickel, gadolinium, and alloys containing them as a main component. Among them, nickel is preferable since it has a high electrical conductivity.

The shape of the ferromagnetic metal nanowire is not particularly limited, but the nanowire usually has a substantially liner shape as a whole, for example, as shown in FIG. 1. The dimensions of the ferromagnetic metal nanowire are usually 10 to 200 nm in average diameter, and around 1 to 100 μm in average length. In the present invention, the average diameter is more preferably 10 to 150 nm, and the average length is more preferably 5 to 50 μm.

From a view point that the resulting coating film exhibits a good light transmittance while having a good electrical conductivity, the aspect ratio (average length/average diameter) of the ferromagnetic metal nanowire is preferably 40 to 200, particularly preferably 45 to 150.

In the present invention, the nanowire preferably has a small deteriorated portion in which the ferromagnetic metal has been oxidized or ionized, from a view point of further improvement in the coating film electrical conductivity. It is particularly preferable that the deteriorated portion is small, that is, the existence of the ferromagnetic metal can be confirmed, in a portion having a depth of up to about 10 nm from the surface of the nanowire. The presence or absence of the ferromagnetic metal in a portion having a depth of up to about 10 nm from the surface of the nanowire can be determined by X-ray photoelectron spectroscopy. For example, in the case of a nickel nanowire, when a peak of metal nickel can be detected at around 852.7 eV in X-ray photoelectron spectroscopy, as shown in FIG. 5 and FIG. 6, it can be said that metal nickel exists in a portion having a depth of up to about 10 nm from the surface of the nanowire. When the deteriorated portion exists on the surface abundantly, no peak of metal nickel can be confirmed at around 852.7 eV, as shown in FIG. 4.

That the existence of the ferromagnetic metal in the surface layer of the nanowire can be confirmed (that is, there is the ferromagnetic metal) means, for example, in the case of nickel, that there is a portion where the gradient of a tangential line is 0 at 851.5 to 853.5 eV in a spectrum by X-ray photoelectron spectroscopy.

In the present invention, from a view point of a dispersibility and a coating film electrical conductivity, it is preferable that the nanowire has a layer (film) of the polymer compound on a surface thereof. The average thickness of the polymer compound layer is preferably less than 10 nm, further preferably 7 nm or less. When the thickness of the layer of the polymer compound is less than 10 nm, influence on the surface resistivity of the formed nanowire film can be suppressed, and a dispersibility of the nanowire can be secured. The average thickness of the polymer compound layer is usually around 1 nm or more. The presence or absence and the kind of the polymer compound layer can be confirmed by pyrolysis GC/MS (gas chromatography mass spectroscopy). By staining the nanowire and observing the nanowire with a transmission electron microscope, the existence and the thickness of the polymer compound layer can be confirmed as in FIG. 2. In the case where the nanowire has no polymer compound layer, even when the nanowire is stained, no polymer compound layer can be confirmed, as shown in FIG. 3. When the nanowire has the polymer compound layer on the surface thereof, it is preferable that the existence of the ferromagnetic metal can be confirmed in a portion having a depth of up to 10 nm from the layer surface. When the nanowire has the polymer compound layer on the surface thereof, it is preferable that the existence of the ferromagnetic metal can be confirmed in a portion having a depth of up to about 10 nm from the surface of the polymer compound layer of the nanowire.

The polymer compound constituting the polymer compound layer is not particularly limited, and a combination with a dispersing medium described later is important. As the polymer compound, a polymer soluble in the dispersing medium is used. That the polymer compound is soluble in the dispersing medium means that the polymer compound can be dissolved in the dispersing medium, and it is sufficient that at least 0.1 part by mass of the polymer compound can be dissolved in 100 parts by mass of the dispersing medium at 25° C. Even when the polymer compound is soluble in the dispersing medium, the polymer compound which once formed a layer on a nanowire surface remains on the nanowire surface in the dispersion, without dissolving in the dispersing medium.

For example, when the ferromagnetic metal nanowire is dispersed in a water solvent, a water-soluble polymer compound such as carboxymethylcellulose sodium salt, polyacrylic acid, poly(sodium acrylate), polyvinyl alcohol, polyethylene glycol, methylcellulose, hydroxyethylcellulose, polyacrylamide, and polyvinylpyrrolidone is preferable.

For example, when the ferromagnetic metal nanowire is dispersed in an organic solvent having a polarity such as ethanol, a polymer compound soluble in an alcohol such as polyvinyl alcohol, polyethylene glycol, methylcellulose, and polyvinylpyrrolidone is preferable.

Among these polymer compounds, polyvinylpyrrolidone is further preferable because it has many solvent species in which it is soluble.

The molecular weight of the polymer compound should be such a molecular weight that the viscosity of a reaction solution measured with a B-type viscometer described later is within a specified range.

In the present invention, the dispersing medium is not particularly limited. The dispersing medium may be usually water, an organic solvent or a mixture thereof. Examples of the organic solvent include monoalcohols (particularly, saturated aliphatic monoalcohols) such as methanol, ethanol, isopropyl alcohol, normal propyl alcohol, butanol, pentanol, and hexanol; polyols (particularly, saturated aliphatic polyols) such as ethylene glycol and propylene glycol; nitrile compounds such as acetonitrile; and ester compounds such as ethyl acetate and butyl acetate. From a view point of further improvement in the dispersibility and the coating film electrical conductivity, the dispersing medium is preferably water, a saturated aliphatic monoalcohol, a saturated aliphatic polyol, or a mixture thereof. From a view point of a low boiling point, odor and safety, isopropyl alcohol and normal propyl alcohol are preferable.

It is preferable that the dispersing medium is a solvent that exhibits reducibility or a solvent containing an antioxidant. This is because oxidation or ionization of a nanowire surface which occurs during storage of the dispersion is more surely prevented, and the ferromagnetic metal is easily contained in the nanowire surface layer. As a result, the coating film electrical conductivity is further improved.

The solvent that exhibits reducibility is a solvent that exhibits reducibility by heating and a solvent that exhibits reducibility even at room temperature (25° C.). Examples of such a solvent exhibiting reducibility include polyols such as ethylene glycol and propylene glycol, particularly, saturated aliphatic polyols, among the dispersing media described above.

The solvent containing an antioxidant contains an antioxidant and a solvent. The antioxidant is not particularly limited, as far as it is used as a compound having an antioxidant action in the field of the dispersion. For example, reducing agents which are the same as reducing agents used in the metal ion reduction treatment step described later are used. As a preferable antioxidant, hydroxylamines (particularly, diethylhydroxylamine), hydrazine, hydrazine monohydrate, oxalic acid, and formic acid are used. The solvent to which such an antioxidant is added is not particularly limited, as far as it is a solvent which can dissolve the antioxidant, among the dispersing media described above. Examples of the solvent include water, the above monoalcohols (particularly, saturated aliphatic monoalcohols), the above nitrile compounds, the above ester compounds, and mixtures thereof.

The concentration of the antioxidant in the dispersion is not particularly limited, as far as oxidation of the nanowire surface is suppressed. Since the concentration differs depending on the kind of the antioxidant, it cannot be unconditionally defined. Usually, the concentration is around 0.01 to 10% by mass, based on the total amount of the dispersion. Specifically, for example, when the antioxidant is hydrazine monohydrate, the concentration thereof is preferably 0.05 to 2% by mass. For example, when the antioxidant is a hydroxylamine (particularly, diethylhydroxylamine), the concentration thereof is preferably 0.1 to 5% by mass. For example, when the antioxidant is formic acid, the concentration thereof is preferably 0.01 to 10% by mass. For example, when the antioxidant is oxalic acid, the concentration thereof is preferably 0.01 to 0.1% by mass.

The concentration of the nanowire in the dispersion is not particularly limited, and can be adjusted to a concentration suitable for various film forming methods and applications. For example, when wet film formation is performed, the nanowire concentration is usually 0.1 to 5% by mass, preferably 0.1 to 2.0% by mass, based on the total amount of the dispersion.

The nanowire dispersion of the present invention can contain additives such as a binder resin, a wetting agent, and a leveling agent for film forming property and improvement thereof, as far as the effect of the present invention is not deteriorated.

By the addition of the binder resin, adhesiveness between the metal nanowire and a substrate after the application can be retained. The binder resin may be a binder resin which is soluble in a dispersing medium, or a binder resin which is dispersible in a dispersing medium without being dissolved. Preferably, a binder resin which is soluble in a dispersing medium is used.

Specific examples of the binder resin include polyacryloyl compounds such as polymethyl methacrylate, polyacrylate, and polyacrylonitrile; polyvinyl alcohol; polyesters such as polyethylene terephthalate and polyethylene naphthalate; polycarbonate; epoxy; aliphatic polyolefins such as polypropylene and polymethylpentane; alicyclic olefins such as polynorbornene; celluloses such as nitrocellulose; silicone resins; polyacetate; chlorine-containing polymers such as polyvinyl chloride, chlorinated polyethylene, and chlorinated polypropylene; and fluorine-containing polymers such as polyfluorovinylidene, polytetrafluoroethylene, polyhexafluoropropylene, and fluoro olefin-hydrocarbon olefin copolymerized polymer. The content of the binder resin is appropriately selected within a range in which the effect of the present invention is not deteriorated. From a view point of further improvement in the coating film electrical conductivity, the content of the binder resin is preferably 1:0.01 to 1:10 as expressed by the mass ratio of the nanowire to the binder resin.

[Method for Producing Ferromagnetic Metal Nanowire Dispersion]

The ferromagnetic metal nanowire dispersion of the present invention can be produced, for example, by the following method. First, a ferromagnetic metal nanowire is made. A method for making the ferromagnetic metal nanowire is not particularly limited. Preferably, a metal ion reduction treatment step shown below is performed to make the ferromagnetic metal nanowire.

Metal Ion Reduction Treatment Step

In the present step, a ferromagnetic metal ion is reduced in a solution of a polymer compound to make the ferromagnetic metal nanowire. The polymer compound used in the present step is a polymer compound which is the same as the above polymer compound constituting a polymer compound layer that can be possessed by a nanowire on the surface thereof. By making the ferromagnetic metal nanowire in the presence of the polymer compound, the polymer compound acts as a template, and suppresses aggregation and fusion of the nanowire during the making. Further, a polymer compound layer can be suitably formed on the ferromagnetic metal nanowire. As a result, entanglement of nanowires can be prevented to suppress reduction in the dispersibility of the nanowire. Details of the present step will be described below.

In order to reduce the ferromagnetic metal ion, it is preferable to dissolve a salt of a ferromagnetic metal in a solvent. The ferromagnetic metal used in the present step is the same metal as the ferromagnetic metal constituting the nanowire. The ferromagnetic metal salt should be soluble in a solvent to be used, and be capable of supplying a ferromagnetic metal ion in a reducible state. Examples thereof include chlorides, sulfates, nitrates, and acetates of the ferromagnetic metal. These salts may be hydrates or anhydrides.

The concentration of the ferromagnetic metal ion is not particularly limited, as far as the nanowire can be made. The concentration of the ferromagnetic metal ion is, for example, preferably 50 μmol/g or less, further preferably 25 μmol/g or less, based on the total amount of a reaction solution. By adjusting the concentrating of the ferromagnetic metal ion to 50 μmol/g or less, the template-like action of the polymer compound at the time of making can be effectively obtained. The lower limit value of the concentration of the ferromagnetic metal ion is not particularly limited, but the concentration is usually 1 μmol/g or more, particularly 10 μmol/g or more.

A reducing agent used for reducing the ferromagnetic metal ion is not particularly limited. Examples thereof include hydrazine, hydrazine monohydrate, ferrous chloride, hypophosphorous acid, boron hydride salt, aminoboranes, aluminum lithium hydride, sulfites, hydroxylamines (for example, diethylhydroxylamine), zinc amalgam, diisobutyl aluminum hydride, hydroiodic acid, ascorbic acid, oxalic acid, and formic acid. Among them, from a view point of reduction efficiency, safety, removability and maintenance of properties of the ferromagnetic metal after reduction, hydrazine monohydrate is preferable.

The concentration of the reducing agent in the present step is not particularly limited, as far as the nanowire is made. The concentration of the reducing agent is preferably around 0.5 to 5.0% by mass based on the total amount of the reaction solution, and it is possible to suitably reduce the ferromagnetic metal ion at this concentration.

In the reduction reaction, it is preferable to apply an external pressure in order to grow the nanowire into a linear shape having anisotropy. Examples of the external pressure include a flow of a liquid by stirring, gravity and a magnetic force. Among them, it is preferable to apply a magnetic force to perform a reduction reaction, from a view point of ease of control. As a magnetic force, when a magnetic flux density of around 50 to 200 mT is applied to the center of a reaction solution, it is possible to suitably obtain the nanowire along the magnetic field direction.

As the solvent for the reduction reaction, water, an organic solvent having a polarity or a mixture thereof can be used. Examples of the organic solvent having a polarity include methanol, ethanol, isopropyl alcohol, normal propyl alcohol, butanol, pentanol, hexanol, ethylene glycol, and propylene glycol. Among them, the organic solvent, particularly, ethylene glycol is further preferable, from a view point of solubility of the ferromagnetic metal salt and the polymer compound, boiling point, viscosity, and the like.

In the reduction reaction, a complexing agent can also be added. Addition of the complexing agent is performed in order to control the rate of supplying the ferromagnetic metal ion and make formation of the nanowire easy by forming a complex with the ferromagnetic metal ion.

The complexing agent is not particularly limited, and a complexing agent having a high complex formation constant with the ferromagnetic metal ion to be used is preferable. Examples thereof include citric acid, ethylenediaminetetraacetic acid, hydroxyethylethylenediaminetriacetic acid, diethylenetriaminepentaacetic acid, triethylenetetraminehexaacetic acid, nitrilotriacetic acid, hydroxyethyliminodiacetic acid, hydroxyiminodisuccinic acid, aminotrimethylenephosphonic acid, hydroxyethanephosphonic acid, tartaric acid, succinic acid, adipic acid, and maleic acid. These may form a salt with sodium or the like. When the complexing agent is used, the concentration thereof is preferably 0.1 nmol/g or more.

In the reduction reaction, it is preferable to add a noble metal salt acting as a nucleating agent. The noble metal salt is a salt of a metal consisting of any of gold, silver, platinum, palladium, rhodium, iridium, ruthenium and osmium. The noble metal salt has high reducibility and is easily liquid phase-reduced as nanoparticles. For this reason, by adding the noble metal salt to a reaction solution, a nanoparticle nucleus of a few nanometers in size is produced. This nanoparticle nucleus serving as a scaffold makes formation of the ferromagnetic metal nanowire easy. Examples of the noble metal salt include chloroplatinic acid, chloroauric acid, and palladium chloride. Among them, chloroplatinic acid is preferable since it uniformly produces finer nanoparticles by liquid phase reduction.

The concentration of the noble metal salt is not particularly limited. As described above, since the nanoparticle nucleus produced from the noble metal salt serves as a scaffold for formation of the nanowire, as the concentration thereof is higher, the diameter of the nanowire is smaller, and as the concentration thereof is lower, the diameter of the nanowire is larger. Usually, the concentration thereof is preferably around 0.001 to 5 μmol/g.

The pH and the temperature of the reduction reaction solution should be set at such a pH and a temperature that the reducing agent can reduce the ferromagnetic metal ion. Generally, as the temperature is higher, or the pH is higher, the reducing power of the reducing agent is higher. Thus, a higher temperature or a higher pH is preferable, but there is an applicable range depending on the kind of the solvent, reducing agent, and ferromagnetic metal salt. For example, when a reduction reaction is performed using hydrazine monohydrate in ethylene glycol or in a water solvent, it is preferable that the temperature is 70° C. to 100° C., and the pH is 10 to 12.

The reducing time of the reduction reaction is not particularly limited, as far as the nanowire having the above dimension is made, and is, for example, 10 minutes to 5 hours.

It is preferable that a reaction solution contains the polymer compound in the reduction reaction. The concentration of the polymer compound differs about a suitable region thereof depending on the structure, molecular weight, and the like of the polymer compound. It is preferable that the concentration is such a concentration that the viscosity of the reaction solution measured with a B-type viscometer at a reaction temperature is 20 mPa·S to 500 mPa·s, particularly 40 mPa·s to 400 mPa·s. In this manner, the ferromagnetic metal nanowire having a suitable polymer compound layer can be made, and aggregation and fusion of the nanowires can be suppressed.

In the present step, after the ferromagnetic metal nanowire is made, purification for the purpose of removing the reducing agent and the byproduct can be performed. At this time, when the surface of the ferromagnetic metal nanowire has a polymer compound layer, entanglement and aggregation of nanowires can be suppressed. Examples of the purification method include a method of immersing, in a solvent, a ferromagnetic metal nanowire dispersion held in an ultrafiltration membrane, and a method of recovering the ferromagnetic metal nanowire using a magnet, in addition to the general filtration and centrifugation. Even when such a purification treatment is performed, the polymer compound layer on the nanowire surface does not peel off.

In the present invention, it is preferable that the ferromagnetic nanowire is reduced before the dispersion treatment. More particularly, from a view point of further improvement in the coating film electrical conductivity, it is preferable that the ferromagnetic metal nanowire is subjected to a nanowire reduction treatment step shown below, after the metal ion reduction treatment step and before the step of dispersion treatment in a dispersing medium.

Nanowire Reduction Treatment Step

In the present step, the ferromagnetic metal nanowire is reduced. By this reduction treatment, a deteriorated portion due to oxidation or ionization of a surface produced during making and purification of the nanowire can be removed more sufficiently, and the ferromagnetic metal is easily contained in the nanowire surface layer.

The reduction treatment of the present step is not particularly limited, as far as the reduction treatment of the ferromagnetic metal nanowire is achieved. For example, the ferromagnetic metal nanowire is heated in a solvent that exhibits reducibility or in a solvent containing a reducing agent. Even when such reduction treatment is performed, the polymer compound layer on the nanowire surface does not peel off.

The solvent that exhibits reducibility or the solvent containing the reducing agent which is used in the present step is a solvent that exhibits reducibility or a solvent containing an antioxidant, which is the same as that described in explanation of the ferromagnetic metal nanowire dispersion, respectively.

As for the solvent that exhibits reducibility in the present step, a preferable solvent is a polyol such as ethylene glycol and propylene glycol, particularly a saturated aliphatic polyol.

As for the solvent containing the reducing agent in the present step, as a preferable reducing agent, hydroxylamines, hydrazine, hydrazine monohydrate, oxalic acid, formic acid and the like are used. A solvent to which the reducing agent is added is not particularly limited, as far as it is a solvent which can dissolve the reducing agent. As a preferable solvent, water or the above monoalcohol (particularly, a saturated aliphatic monoalcohol) is used.

The concentration of the reducing agent in the solvent containing the reducing agent is not particularly limited, as far as reduction of the nanowire surface is achieved. The concentration is usually 0.01 to 10% by mass, preferably 0.05 to 5% by mass, based on the total amount of the reaction solution.

The nanowire concentration in the reaction solution is not particularly limited, as far as reduction of the nanowire surface is achieved. The concentration is usually 0.01 to 10% by mass, preferably 0.1 to 5.0% by mass, based on the total amount of the reaction solution.

The heating temperature and the heating time in the present step are not particularly limited, as far as reduction of the nanowire surface is achieved. The heating temperature is usually 70 to 200° C. The heating time is usually 1 to 5 hours.

In the present step, after the ferromagnetic metal nanowire is reduced, purification for the purpose of removing the reducing agent and the byproduct can be performed. As the purification method, a purification method which is the same as that described in explanation of the metal ion reduction treatment step is used.

In the present invention, usually, the nanowire which has been recovered and isolated in the metal ion reduction treatment step or the nanowire which has been recovered and isolated in the nanowire reduction treatment step is subjected to a dispersion treatment step shown below. When the nanowire is not recovered and isolated in each of the above steps, it is not necessarily required to perform the dispersion treatment step, and a dispersion containing the nanowire obtained in each of the above steps can be used as it is as the nanowire dispersion of the present invention.

Dispersion Treatment Step

In the present step, the ferromagnetic metal nanowire is dispersed in a dispersing medium. Thus, the ferromagnetic metal nanowire dispersion of the present invention is obtained. The present step is usually performed in a non-heated state, for example, at room temperature (25° C.). As the dispersing medium, a dispersing medium which is the same as that described in explanation of the ferromagnetic metal nanowire dispersion is used. The blending amount of the nanowire may be such an amount that the nanowire concentration in the nanowire dispersion described in explanation of the ferromagnetic metal nanowire dispersion is achieved.

When the above additive is added to the ferromagnetic metal nanowire dispersion of the present invention, the additive may be added to the dispersing medium in advance.

Specified Embodiment

The ferromagnetic metal nanowire dispersion of the present invention can be usually obtained by performing at least the metal ion reduction treatment step and the dispersion treatment step.

By obtaining the ferromagnetic metal nanowire dispersion of the present invention via a step according to the following preferable embodiment A or B, it becomes possible to confirm a ferromagnetic metal in the nanowire surface layer, and the coating film electrical conductivity is further improved.

Preferable Embodiment A:
(i) a metal ion reduction treatment step; and
(ii) a dispersion treatment step (in the step, as the dispersing medium, a solvent that exhibits reducibility or a solvent containing an antioxidant is used).

Preferable Embodiment B:
(i) a metal ion reduction treatment step;
(ii) a nanowire reduction treatment step; and
(iii) a dispersion treatment step (in the step, as the dispersing medium, a solvent other than a solvent that exhibits reducibility and a solvent containing an antioxidant is used).

By obtaining the ferromagnetic metal nanowire dispersion of the present invention via a step according to the following most preferable embodiment, it becomes possible to confirm a ferromagnetic metal in the nanowire surface layer, and the coating film electrical conductivity is improved most.

Most Preferable Embodiment:
(i) a metal ion reduction treatment step;
(ii) a nanowire reduction treatment step; and
(iii) a dispersion treatment step (in the step, as the dispersing medium, a solvent that exhibits reducibility or a solvent containing an antioxidant is used).

[Method of Use and Application]

By applying the nanowire dispersion of the present invention to a substrate and drying the dispersion, a film, wiring or the like can be formed to obtain a laminate. Examples of the substrate include a glass substrate, a polyethylene terephthalate film, a polycarbonate film, a cycloolefin film, a polyimide film, a polyamide film, a ceramic sheet, and a metal plate.

The method of application is not particularly limited. Examples thereof include a wire bar coater coating method, a film applicator coating method, a spray coating method, a gravure roll coating method, a screen printing method, a reverse roll coating method, a lip coating method, an air knife coating method, a curtain flow coating method, a dip coating method, a die coating method, a spray method, a relief printing method, an intaglio printing method, and an inkjet method.

Since the ferromagnetic metal nanowire dispersion of the present invention is good in the wire dispersed state, after the application of the dispersion, the metal nanowire is formed into a film without aggregation on the substrate. For this reason, a coating film exhibiting a good electrical conductivity can be formed. Further, by adjusting the aspect ratio of the nanowire in the above range, a coating film exhibiting a high light transmittance while showing a better electrical conductivity can be formed.

After the application, the nanowire dispersion of the present invention can be subjected to post-treatment for the purpose of improving the electrical conductivity. Examples of the post-treatment include heat treatment of holding the coating film at a temperature higher than or equal to a temperature at which the polymer compound is softened, nanowire-press bonding treatment of pressing the coating film at a pressure of around 10 to 30 MPa, and treatment of removing the polymer compound with a plasma cleaner.

The nanowire dispersion of the present invention is a dispersion which is excellent in dispersion stability and is suitable for wet coating. A nanowire film obtained from the dispersion is excellent in electrical conductivity, and can exert an electrical conductivity even in the state where it has a high light transmittance of 80% or more. For this reason, the nanowire film can be utilized not only in an electrically conductive film and an electrically conductive paint, but also in an electrode for a touch panel, an electrode for a display, an electrode for a solar cell, a transparent electromagnetic wave shield, a transparent heater, and the like. The nanowire dispersion of the present invention can be suitably used in a nano-magnetic material, an anisotropic material, a magnetic film, and the like, by utilizing anisotropy, orientability, and magnetic field responsiveness possessed by the ferromagnetic metal nanowire.

EXAMPLES

Then, the present invention will be described by way of examples, but the present invention is not limited to these examples.

A. Evaluation Method

Evaluation methods used in examples and comparative examples are as follows.

(1) Measurement of Nanowire Length

A photograph of a nanowire which had been dried on a sample base was taken with a scanning electron microscope, all the nanowire lengths in the field were measured, and an average length, a D10 value, and a D90 value were calculated from a total of around 400 nanowire lengths. By taking a photograph at a magnification of 4000 to 6000, about 200 nanowire lengths can be measured per one field.

(2) Measurement of Nanowire Diameter

A photograph of a nanowire which had been dried on a grid equipped with a supporting film was taken with a transmission electron microscope at a magnification of 600000, and the maxim value and the minimum value of the nanowire diameter, and the average of measurement points in 10 fields were measured.

(3) Presence or Absence and Thickness of Polymer Compound Layer

Using a grid equipped with a supporting film, a nanowire was taken out from a nanowire dispersion, stained with 5% phosphotungstic acid for 3 minutes, and observed with a transmission electron microscope at a magnification of 600000. Thus, the presence or absence of a polymer compound layer was determined. Further, from the resulting image, the thickness of the polymer compound layer was measured at 50 places, and the average thereof was defined as the thickness of the polymer compound layer.

(4) Identification of Polymer Compound Layer

A nanowire was recovered from a nanowire dispersion by filtration, and the polymer compound layer was identified by instantaneous pyrolysis GC/MS at a heating temperature of 600° C.

The polymer compound layer is thought to have a difference in reduction in the molecular weight or the like, but fundamentally, the polymer compound layer is made of the added polymer compound species.

(5) Presence or Absence of Ferromagnetic Metal on Nanowire Surface

A nanowire was recovered from a nanowire dispersion by filtration, and the presence or absence was confirmed by X-ray photoelectron spectroscopy. For example, in the case of nickel, narrow scanning of a 2p band of nickel was performed, and the presence or absence was determined by the presence or absence of a peak of metal nickel.

A region which can be measured by X-ray photoelectron spectroscopy is a layer in a portion having a depth of up to 10 nm from the surface. When a peak of a metal can be confirmed by measurement, it can be determined that a ferromagnetic metal exists on the surface layer of the nanowire.

(6) Dispersibility of Nanowire Dispersion

A nanowire dispersion was stored at room temperature (25° C.) for 30 days, and dispersibility was evaluated according to the following criteria.

A: Nanowires were not aggregated, and a good dispersibility was maintained.

B: An aggregated particle of nanowires was seen, but the dispersibility was not practically problematic.

C: Nanowires were not dispersed.

(7) Surface Resistivity of Nanowire Film

A nanowire dispersion which had been stored by the same method as that of (6) was used.

Using an applicator, a nanowire dispersion was applied to a slide glass, and dried at 100° C. for 1 minute under nitrogen to obtain a nanowire film. Concerning the surface resistivity of the resulting nanowire film, a voltage of 10 V was applied, and the surface resistivity was measured in accordance with JIS K7194 using a resistivity meter MCP-T610 made by Mitsubishi Chemical Analytech Co., Ltd.

The surface resistivity was determined to be $10^8$ Ω/sq. or more when it exceeded the measuring ability of MCP-T610. A range of $10^{10}$ Ω/sq. or less is a practically acceptable range, a range of $10^8$ Ω/sq. or less is a preferable range, a range of $10^6$ Ω/sq. or less is a more preferable range, a range of $10^4$ Ω/sq. or less is a further preferable range, and a range of $10^3$ Ω/sq. or less is the most preferable range.

(8) Light Transmittance of Nanowire Film

According to the same method as that of (7), a nanowire film was made, and the light transmittance at a wavelength of 550 nm was measured with the light transmittance of a slide glass being a blank value.

A preferable range of the light transmittance is a range of 70% or more, and a more preferable range is a range of 80% or more.

(9) Haze Value

According to the same method as that of (7), a nanowire film was made, and the haze value was measured from transmitted light in total light, with the haze value of a slide glass being a blank value.

A preferable range of the haze value is a range of 30% or less, a more preferable range is a range of 20% or less, and a further preferable range is a range of 10% or less.

B. Materials

Materials used in examples and comparative examples are as follows.

(1) Polymer Compound

PITZCOL K120L

Aqueous polyvinylpyrrolidone solution made by DKS CO., LTD.

BS

Carboxymethylcellulose sodium salt made by DKS CO., LTD.

(2) Solvent, Reducing Agent, Antioxidant, Ferromagnetic Metal Salt, Noble Metal Salt, Complexing Agent As for materials other than the polymer compound, special grade or first grade reagents were used.

C. Methods for Making Ferromagnetic Metal Nanowire

Methods for making ferromagnetic metal nanowires used in examples and comparative examples are as follows.

Method for Making Nanowire NiA (Present Invention)

In 350 g of ethylene glycol were dissolved 1.95 g (8.24 mmol) of nickel chloride hexahydrate and 0.245 g (0.83 mmol) of trisodium citrate dihydrate. Further, 1.60 g of sodium hydroxide, 15.0 g of a dried product of PITZCOL K120L, and 4.60 g of a 0.054 M aqueous chloroplatinic acid solution were dissolved in this order, and thereafter, ethylene glycol was added so that the total amount was 375 g to produce a ferromagnetic metal ion solution.

Separately, in 100 g of ethylene glycol were dissolved 0.50 g of sodium hydroxide and 0.245 g (0.83 mmol) of trisodium citrate dihydrate. Further, 5.0 g of a dried product of PITZCOL K120L and 6.25 g of hydrazine monohydrate were dissolved in this order, and thereafter, ethylene glycol was added so that the total amount was 125 g to produce a reducing agent solution.

After both of the ferromagnetic metal ion solution and the reducing agent solution were heated to 90 to 95° C., they were mixed while the temperature was maintained, a magnetic field of 150 mT was applied to the center of the reaction solution, and the reaction solution was allowed to stand for 1 hour and 30 minutes to perform a reduction reaction (metal ion reduction treatment step: reduction treatment A). In the solution, the concentration of a nickel ion was 17 µmol/g, the concentration of a polymer compound was 4%, the concentration of a platinum ion was 0.5 µmol/g, the concentration of trisodium citrate dihydrate was 3.3 nmol/g, the pH was 11, and the viscosity measured with a B-type viscometer at the reaction temperature was 240 mPa·s.

In order to purify and recover a nanowire from the resulting reaction solution, 100 g of the reaction solution was diluted with ethylene glycol by ten times, and an operation of forcibly precipitating a nickel nanowire with a magnet, and removing the supernatant was repeated. By repeating the operation four times, it was confirmed that the pH of the supernatant to be removed became 6.5 to 7.5, and thereafter, a nickel nanowire NiA was recovered and isolated, and dried. An X-ray photoelectron spectroscopic spectrum of this nanowire is shown in FIG. 4. The measuring conditions of FIG. 4 are as follows: X-ray source: monochrome Al-Kα, X-ray output: 200 W, photoelectron emission angle: 75°, path energy: 58.70 eV, charge shift correction: C—H binding energy of a C1s peak is corrected to 284.8 eV.

Method for Producing Nanowire NiB (Present Invention)

In 350 g of ethylene glycol were dissolved 1.95 g (8.24 mmol) of nickel chloride hexahydrate and 0.245 g (0.83 mmol) of trisodium citrate dihydrate. Further, 1.60 g of sodium hydroxide, 15.0 g of a dried product of PITZCOL K120L, and 4.60 g of a 0.054 M aqueous chloroplatinic acid solution were dissolved in this order, and thereafter, ethylene glycol was added so that the total amount was 375 g to produce a ferromagnetic metal ion solution.

Separately, in 100 g of ethylene glycol were dissolved 0.50 g of sodium hydroxide and 0.245 g (0.83 mmol) of trisodium citrate dihydrate. Further, 5.0 g of a dried product of PITZCOL K120L and 6.25 g of hydrazine monohydrate were dissolved in this order, and thereafter, ethylene glycol was added so that the total amount was 125 g to produce a reducing agent solution.

After both of the ferromagnetic metal ion solution and the reducing agent solution were heated to 80 to 85° C., they were mixed while the temperature was maintained, a magnetic field of 150 mT was applied to the center of the reaction solution, and the reaction solution was allowed to stand for 1 hour and 30 minutes to perform a reduction reaction (metal ion reduction treatment step: reduction treatment A). In the solution, the concentration of a nickel ion was 17 µmol/g, the concentration of a polymer compound was 4%, the concentration of a platinum ion was 0.5 µmol/g, the concentration of trisodium citrate dihydrate was 3.3 nmol/g, the pH was 11, and the viscosity measured with a B-type viscometer at the reaction temperature was 360 mPa·s.

According to the same method as that in the case of NiA, the resulting reaction solution was purified and a nickel nanowire NiB was recovered and isolated, and dried.

Method for Producing Nanowire NiC (Present Invention)

In 350 g of ethylene glycol were dissolved 1.95 g (8.24 mmol) of nickel chloride hexahydrate and 0.245 g (0.83 mmol) of trisodium citrate dihydrate. Further, 1.60 g of sodium hydroxide, 15.0 g of a dried product of PITZCOL K120L, and 4.60 g of a 0.054 M aqueous chloroplatinic acid solution were dissolved in this order, and thereafter, ethylene glycol was added so that the total amount was 375 g to produce a ferromagnetic metal ion solution.

Separately, in 100 g of ethylene glycol were dissolved 0.50 g of sodium hydroxide and 0.245 g (0.83 mmol) of trisodium citrate dihydrate. Further, 5.0 g of a dried product of PITZCOL K120L and 6.25 g of hydrazine monohydrate were dissolved in this order, and thereafter, ethylene glycol was added so that the total amount was 125 g to produce a reducing agent solution.

After both of the ferromagnetic metal ion solution and the reducing agent solution were heated to 80 to 85° C., they were mixed while the temperature was maintained, a magnetic field of 150 mT was applied to the center of the reaction solution, and the reaction solution was allowed to stand for 20 minutes to perform a reduction reaction (metal ion reduction treatment step: reduction treatment A). In the solution, the concentration of a nickel ion was 17 µmol/g, the concentration of a polymer compound was 4%, the concentration of a platinum ion was 0.5 µmol/g, the concentration of trisodium citrate dihydrate was 3.3 nmol/g, the pH was 11, and the viscosity measured with a B-type viscometer at the reaction temperature was 360 mPa-s.

According to the same method as that in the case of NiA, the resulting reaction solution was purified and a nickel nanowire NiC was recovered and isolated, and dried.

Method for Producing Nanowire NiD (Comparison)

In 350 g of ethylene glycol were dissolved 1.95 g (8.24 mmol) of nickel chloride hexahydrate and 0.245 g (0.83 mmol) of trisodium citrate dihydrate. Further, 1.60 g of sodium hydroxide and 4.60 g of a 0.054 M aqueous chloroplatinic acid solution were dissolved in this order, and thereafter, ethylene glycol was added so that the total amount was 375 g to produce a ferromagnetic metal ion solution.

Separately, in 100 g of ethylene glycol were dissolved 0.50 g of sodium hydroxide and 0.245 g (0.83 mmol) of trisodium citrate dihydrate. Further, 6.25 g of hydrazine monohydrate was dissolved, and thereafter, ethylene glycol was added so that the total amount was 125 g to produce a reducing agent solution.

After both of the ferromagnetic metal ion solution and the reducing agent solution were heated to 80 to 85° C., they were mixed while the temperature was maintained, a magnetic field of 150 mT was applied to the center of the reaction solution, and the reaction solution was allowed to stand for 1 hour and 30 minutes to perform a reduction reaction (metal ion reduction treatment step: reduction treatment A). In the solution, the concentration of a nickel ion was 17 µmol/g, the concentration of a polymer compound was 0%, the concentration of a platinum ion was 0.5 µmol/g, the concentration of trisodium citrate dihydrate was 3.3 nmol/g, the pH was 11, and the viscosity measured with a B-type viscometer at the reaction temperature was 5 mPa·s.

After the reaction, a ferromagnetic metal nanowire NiD which was aggregated in a sheet form was recovered and isolated by suction filtration, and dried.

Method for Producing Nanowire NiE (Present Invention)

In 50 g of pure water were dissolved 0.59 g (2.48 mmol) of nickel chloride hexahydrate and 0.37 g (1.26 mmol) of trisodium citrate dihydrate. Further, a 5% aqueous sodium hydroxide solution was added dropwise to adjust the pH to 11.5, and 1 g of BS was dissolved. After dissolution, 0.93 g of a 0.054 M aqueous chloroplatinic acid solution was added, and thereafter, water was added so that the total amount was 75 g to produce a ferromagnetic metal ion solution.

Separately, 40 mg of 5% sodium hydroxide and 1.25 g of hydrazine monohydrate were added to 20 g of pure water to produce a reducing agent solution. Thereafter, pure water was added so that the total amount was 25 g to produce a reducing agent solution.

After both of the ferromagnetic metal ion solution and the reducing agent solution were heated to 80 to 85° C., they were mixed while the temperature was maintained, a magnetic field of 150 mT was applied to the center of the reaction solution, and the reaction solution was allowed to stand for 1 hour to perform a reduction reaction (metal ion reduction treatment step: reduction treatment A). In the solution, the concentration of a nickel ion was 24.8 µmol/g, the concentration of a polymer compound was 1%, the concentration of a platinum ion was 0.5 µmol/g, the concentration of trisodium citrate dihydrate was 12.6 nmol/g, the pH was 11.5, and the viscosity measured with a B-type viscometer at the reaction temperature was 50 mPa·s.

In order to purify and recover a nanowire from the resulting reaction solution, 100 g of the reaction solution was diluted with pure water by ten times, and an operation of forcibly precipitating a nickel nanowire with a magnet and removing the supernatant was repeated. By repeating the operation four times, it was confirmed that the pH of the supernatant to be removed became 6.5 to 7.5, and thereafter, a nickel nanowire NiE was recovered and isolated, and dried.

The dimension and the surface state of the produced nanowire are shown in Table 1.

TABLE 1

| | Nanowire length | | | Nanowire diameter | | | Aspect ratio Average | Polymer compound layer | |
| --- | --- | --- | --- | --- | --- | --- | --- | --- | --- |
| | Average length (µm) | D10 value (µm) | D90 value (µm) | Maximum value (nm) | Minimum value (nm) | Average diameter (nm) | length/ Average diameter | Presence or absence | Kind |
| NiA | 10.0 | 4.2 | 17.4 | 132.5 | 62.4 | 90.4 | 110 | Present | Polyvinylpyrrolidone |
| NiB | 6.5 | 2.5 | 11.1 | 117.1 | 74.3 | 88.5 | 73 | Present | Polyvinylpyrrolidone |
| NiC | 4.2 | 1.7 | 7.3 | 122.5 | 52.3 | 85.6 | 49 | Present | Polyvinylpyrrolidone |

TABLE 1-continued

| | Nanowire length | | | Nanowire diameter | | | Aspect ratio Average | Polymer compound layer | |
|---|---|---|---|---|---|---|---|---|---|
| | Average length (μm) | D10 value (μm) | D90 value (μm) | Maximum value (nm) | Minimum value (nm) | Average diameter (nm) | length/ Average diameter | Presence or absence | Kind |
| NiD | 14.8 | 6.8 | 22.4 | 118.0 | 58.4 | 87.2 | 170 | Absent | — |
| NiE | 6.6 | 2.1 | 13.0 | 113.7 | 63.3 | 89.1 | 74 | Present | Carboxymethylcellulose salt |

Example 1

By mixing 100 mg of the nickel nanowire NiA and 20 g of ethylene glycol, and heating the mixture at 150° C. for 3 hours, reduction treatment was performed (nanowire reduction treatment step: reduction treatment B). The concentration of the nanowire in reduction treatment B relative to the total amount of the reaction solution is shown in Table 2. After heating, the nanowire was recovered by suction filtration. An X-ray photoelectron spectroscopic spectrum of the recovered nanowire is shown in FIG. 5. The measuring conditions of FIG. 5 are as follows: X-ray source: monochrome Al-Kα, X-ray output: 200 W, photoelectron emission angle: 75°, path energy: 58.70 eV, charge shift correction: C—H binding energy of a C1s peak is corrected to 284.8 eV. The recovered nanowire was mixed with isopropanol containing 100 mg of hydrazine monohydrate, and the amount of isopropanol was adjusted so that the total amount became 20 g. Thus, a nanowire dispersion was obtained (dispersion treatment). The concentration of the nanowire and that of the antioxidant in the dispersion treatment relative to the total amount of the dispersion are shown in Table 2. This dispersion was dried, a photograph of the dried product was taken to obtain FIG. 1 and FIG. 2, and an X-ray photoelectron spectroscopic spectrum of the nanowire is shown in FIG. 6. The measuring conditions of FIG. 6 are as follows: X-ray source: monochrome Al-Kα, X-ray output: 200 W, photoelectron emission angle: 75°, path energy: 58.70 eV, charge shift correction: C—H binding energy of a C1s peak is corrected to 284.8 eV.

Examples 2 to 9

In the same manner as in Example 1 except that each of nanowires shown in Table 2 was used, and the nanowire concentration in reduction treatment B and the nanowire concentration in the dispersion treatment, the kind of solvent, and the kind and the concentration of a reducing agent and an antioxidant were changed as shown in Table 2, each of nanowire dispersions was obtained.

Example 10

NiA (100 mg) was mixed with isopropanol containing 100 mg of hydrazine monohydrate, the amount of isopropanol was adjusted so that the total amount became 20 g, and the mixture was stirred under a nitrogen atmosphere for 30 minutes. Thus, a nanowire dispersion was obtained (dispersion treatment). The concentration of the nanowire and that of the antioxidant in the dispersion treatment relative to the total amount of the dispersion are shown in Table 2.

Example 11

NiE (100 mg) was mixed with pure water containing 20 mg of oxalic acid, the amount of pure water was adjusted so that the total amount became 20 g, and the mixture was stirred under a nitrogen atmosphere for 30 minutes. Thus, a nanowire dispersion was obtained (dispersion treatment). The concentration of the nanowire and that of the antioxidant in the dispersion treatment relative to the total amount of the dispersion are shown in Table 2.

Example 12

NiE (100 mg) was mixed with pure water containing 20 mg of oxalic acid, the amount of pure water was adjusted so that the total amount became 20 g, and the mixture was stirred at 80° C. under a nitrogen atmosphere for 30 minutes. Thus, a nanowire dispersion was obtained (nanowire reduction treatment step: reduction treatment B). The concentration of the nanowire and that of the antioxidant in reduction treatment B relative to the total amount of the reaction solution are shown in Table 2.

Example 13

NiA (100 mg) was mixed with isopropanol, and the amount of isopropanol was adjusted so that the total amount became 20 g. Thus, a nanowire dispersion was obtained. In the present example, reduction treatment B was not performed, and the antioxidant was not used in the dispersion treatment.

Comparative Example 1

NiD (100 mg) was mixed with isopropanol, and the amount of isopropanol was adjusted so that the total amount became 20 g. Thereafter, dispersion treatment was performed with an ultrasound homogenizer. A photograph of this nanowire was taken, and is shown in FIG. 3.

Comparative Example 2

In the same manner as in Example 1 except that the nanowire NiD was used, a nanowire dispersion was obtained.

Comparative Example 3

In the same manner as in Example 10 except that the nanowire NiD was used, a nanowire dispersion was obtained.

Comparative Example 4

In the same manner as in Example 1 except that the nanowire NiD was used, and the antioxidant was not used in the dispersion treatment, a nanowire dispersion was obtained.

The production conditions and evaluation results of the nanowire dispersions obtained in examples and comparative examples are shown in Table 2.

TABLE 2

| | Reduction treatment of nanowire (reduction treatment B) | | | Dispersion treatment | | | |
|---|---|---|---|---|---|---|---|
| | Subject Nanowire | | | Nanowire | | Antioxidant | |
| | Nanowire Kind | Concentration (%) | Treatment method | Concentration (%) | Solvent Kind | Kind | Concentration (%) |
| Example 1 | NiA | 0.5 | Heating in EG | 0.5 | i-PrOH | HMH | 0.5 |
| Example 2 | NiA | 1.0 | Heating in EG | 1.0 | i-PrOH | HMH | 0.5 |
| Example 3 | NiA | 0.5 | Heating in EG | 0.5 | EtOH | HMH | 0.5 |
| Example 4 | NiA | 0.5 | Heating in EG | 0.5 | i-PrOH | DEHA | 0.5 |
| Example 5 | NiA | 0.5 | Heating in EG | 0.5 | i-PrOH | DEHA | 1.0 |
| Example 6 | NiA | 0.5 | Heating in EG | 0.5 | EG | EG | 99.5 |
| Example 7 | NiB | 0.5 | Heating in EG | 0.5 | i-PrOH | HMH | 0.5 |
| Example 8 | NiB | 0.5 | Heating in EG | 0.5 | i-PrOH | HMH | 1.0 |
| Example 9 | NiC | 0.5 | Heating in EG | 0.5 | i-PrOH | HMH | 0.5 |
| Example 10 | NiA | — | — | 0.5 | i-PrOH | HMH | 0.5 |
| Example 11 | NiE | — | — | 0.5 | Water | OA | 0.1 |
| Example 12 | NiE | 0.5 | Heating in OA aqueous solution (0.1%) | — | — | — | — |
| Example 13 | NiA | — | — | 0.5 | i-PrOH | — | 0 |
| Comparative Example 1 | NiD | — | — | 0.5 | i-PrOH | — | — |
| Comparative Example 2 | NiD | 0.5 | Heating in EG | 0.5 | i-PrOH | HMH | 0.5 |
| Comparative Example 3 | NiD | — | — | 0.5 | i-PrOH | HMH | 0.5 |
| Comparative Example 4 | NiD | 0.5 | Heating in EG | 0.5 | i-PrOH | — | 0 |

| | Evaluation | | | | | |
|---|---|---|---|---|---|---|
| | Polymer | | | Coating film performance | | |
| | compound layer Kind [average thickness (nm)] | Ferromagnetic metal [1] | Dispersibility | Surface resistivity ($\Omega/\square$) | Transmittance (%) | Haze value |
| Example 1 | PVP (5.2) | Present | A | $1.0 \times 10^2$ | 83.1 | 9.0 |
| Example 2 | PVP (5.1) | Present | A | $4.2 \times 10^2$ | 82.1 | 10.2 |
| Example 3 | PVP (5.0) | Present | A | $3.0 \times 10^2$ | 86.6 | 8.7 |
| Example 4 | PVP (5.0) | Present | A | $6.8 \times 10^3$ | 80.7 | 12.2 |
| Example 5 | PVP (5.1) | Present | A | $1.3 \times 10^3$ | 81.0 | 11.9 |
| Example 6 | PVP (5.2) | Present | A | $2.6 \times 10^{-1}$ | 40.9 | 20.4 |
| Example 7 | PVP (5.3) | Present | A | $6.9 \times 10^2$ | 87.7 | 9.2 |
| Example 8 | PVP (5.3) | Present | B | $9.7 \times 10^2$ | 84.4 | 8.2 |
| Example 9 | PVP (5.3) | Present | A | $2.5 \times 10^3$ | 84.7 | 8.3 |
| Example 10 | PVP (5.2) | Present | A | $5.2 \times 10^5$ | 81.1 | 11.8 |
| Example 11 | CMC (6.4) | Present | A | $5.7 \times 10^3$ | 79.9 | 16.9 |
| Example 12 | CMC (6.4) | Present | A | $8.8 \times 10^2$ | 83.9 | 13.5 |
| Example 13 | PVP (5.2) | Absent | A | $4.0 \times 10^7$ | 80.1 | 12.5 |
| Comparative Example 1 | None | Absent | C | $10^8$ or more | 85.6 | 7.3 |
| Comparative Example 2 | None | Absent | C | $10^8$ or more | 80.3 | 12.3 |
| Comparative Example 3 | None | Absent | C | $10^8$ or more | 82.1 | 9.7 |
| Comparative Example 4 | None | Absent | C | $10^8$ or more | 79.8 | 17.2 |

[1] Presence or absence of a ferromagnetic metal in a layer having a depth of up to 10 nm from the surface.
EG: ethylene glycol.
OA: oxalic acid.
i-PrOH: isopropanol.
EtOH: ethanol.
HMH: hydrazine monohydrate.
DEHA: diethylhydroxylamine.
PVP: polyvinylpyrrolidone.
CMC: carboxymethylcellulose salt.

All of the ferromagnetic metal nanowire dispersions of Examples 1 to 14 have a polymer compound layer on a nanowire surface, and were excellent in dispersibility. Coating films produced from such nanowire dispersions were excellent in an electrical conductivity and transparency.

Since an antioxidant or a solvent that exhibits reducibility is contained in nanowire dispersions finally obtained in Examples 1 to 12, the dispersions were particularly excellent in dispersibility, and the coating films were particularly excellent in electrical conductivity.

Since the nanowire dispersion of Comparative Example 1 had no polymer compound layer on a nanowire surface, the dispersion was poor in dispersibility. A coating film obtained using the nanowire dispersion was poor in electrical conductivity.

Since nanowire dispersions of Comparative Examples 2 to 4 had no polymer compound layer on a nanowire surface, even when the reduction treatment of the nanowire (reduction treatment B) and/or the dispersion treatment in a dispersing medium containing the antioxidant were performed, the dispersions were poor in dispersibility and the coating films were poor in electrical conductivity.

INDUSTRIAL APPLICABILITY

The ferromagnetic metal nanowire dispersion of the present invention can be utilized not only in the production of an electrically conductive film and an electrically conductive paint, but also in the production of an electrode for a touch panel, an electrode for a display, an electrode for a solar cell, a transparent electromagnetic wave shield, a transparent heater, and the like. The ferromagnetic metal nanowire dispersion of the present invention can also be suitably used in production of a nano-magnetic material, an anisotropic material, a magnetic film, and the like, utilizing anisotropy, orientability, and magnetic field responsiveness possessed by the ferromagnetic metal nanowire.

The invention claimed is:

1. A method for manufacturing a ferromagnetic metal nanowire dispersion comprising a ferromagnetic metal nanowire and a polymer compound, the method comprising a step of:

reducing a ferromagnetic metal ion in a solution of a polymer compound to make a ferromagnetic metal nanowire;

reducing, the ferromagnetic metal nanowire to remove any residual oxidation or ionization present on the surface of the nanowires; and dispersing the ferromagnetic metal nanowire in a dispersing medium selected from the group consisting of water, an organic solvent and a mixture thereof.

2. The method for manufacturing the ferromagnetic metal nanowire dispersion of claim 1, wherein the dispersing medium contains an antioxidant or is an organic solvent that exhibits reducibility.

3. An electrically conductive film, which is formed from a ferromagnetic metal nanowire dispersion comprising:

a ferromagnetic metal nanowire;

a polymer compound; and a dispersing medium selected from the group consisting of water, an organic solvent and a mixture thereof, wherein the dispersion compromises a layer of the polymer compound on a surface of the ferromagnetic metal nanowire;

the dispersing medium contains an antioxidant, the organic solvent is selected from monoalcohols and mixtures thereof, and the ferromagnetic metal nanowire is nickel nanowire.

4. A laminate comprising a substrate and the electrically conductive film of claim 3 formed on the substrate.

* * * * *